United States Patent [19]

Muser et al.

[11] Patent Number: 4,556,529

[45] Date of Patent: Dec. 3, 1985

[54] METHOD FOR BONDING MOLDED COMPONENTS SHEETING OR SHAPED MEMBERS

[75] Inventors: Dieter Muser; Norbert Raab, both of Munich; Johann Deger, Viehbach, all of Fed. Rep. of Germany

[73] Assignee: M.A.N. Maschinenfabrik Augsburg-Nurnberg Aktiengesellschaft, Munich, Fed. Rep. of Germany

[21] Appl. No.: 609,150

[22] Filed: May 11, 1984

[30] Foreign Application Priority Data

May 11, 1983 [DE] Fed. Rep. of Germany ....... 3317138

[51] Int. Cl.$^4$ .......................... B29D 3/02; B29G 7/00; B32B 31/12
[52] U.S. Cl. ..................................... 264/258; 156/197; 156/242; 156/245; 156/292; 156/295; 264/251; 264/257; 264/263; 428/73; 428/118; 428/319.1
[58] Field of Search ............... 264/248, 251, 253, 257, 264/258, 263; 156/242, 245, 295, 228, 292, 197; 428/73, 116, 117, 118, 319.1

[56] References Cited

U.S. PATENT DOCUMENTS

| 4,148,854 | 4/1979 | Cordts et al. | 264/258 X |
| 4,199,388 | 4/1980 | Tracy et al. | 264/258 X |
| 4,239,571 | 12/1980 | Cobb | 156/295 X |
| 4,510,198 | 4/1985 | Rheaume | 264/257 X |
| 4,522,284 | 6/1985 | Fearon | 428/116 X |

*Primary Examiner*—David Simmons
*Assistant Examiner*—Thomas Bokan
*Attorney, Agent, or Firm*—Scully, Scott, Murphy & Presser

[57] ABSTRACT

A method for bonding molded components to films, sheeting or shaped members, in which the molded element is constituted of a plastic resin and filler, and is bonded to the sheeting or member. The sheeting or film or shaped member, or plurality thereof, and at least one prefinished but not yet hardened molding composition is introduced into a mold and maintained under a processing pressure and temperature for the hardening of the molded components. The preconditioned and still soft molding composition is directly bonded to the sheeting or film or shaped member in that the plastic resin of the molding composition is partially pressed outwardly during the molding operation so as to bond with the sheeting or shaped member, and thereafter cures or hardens.

1 Claim, 4 Drawing Figures

METHOD FOR BONDING MOLDED COMPONENTS SHEETING OR SHAPED MEMBERS

BACKGROUND OF THE INVENTION

1. Field of the Invention

The present invention relates to a method for bonding molded components to films, sheeting or shaped members, in which the molded element is constituted of a plastic resin and filler, and is bonded to the sheeting or member.

Plastic materials which are produced through various techniques are finding widespread use in broad areas of the technology. A proven method for manufacturing plastic structural components is the pressure-molding process in which molded elements which form final products, or even semi-finished products, are produced from a synthetic resin and a filler (the term filler herein encompasses powdery materials, as well as fibers of suitable lengths and orientation) in a mold under the application of elevated temperature and a molding pressure.

In the building construction industry, such molded components, for instance, are employed directly; in effect without any further processing, such as surface treatment. In many instances however, it is necessary to treat the outer surface of the molded element so as to protect it from external effects; or because of aesthetic reasons, such as when molded elements of that type are to be used in the interior decoration of motor vehicles.

2. Discussion of the Prior Art

A currently known method for the bonding of molded components to protective sheeting or film is the adhesive process. Herein, an adhesive is brushed on the molded compound or applied as a film, and then the protective sheeting is deposited thereon.

However, the application of the adhesive requires a relatively long worktime. Moreover, this method also presents certain difficulties when the molded components have an irregular configuration, and when it is desired to provide an especially uniform application of adhesive.

The term sheeting of film is to be understood in that it also includes paints; for instance, a layer of varnish or lacquer which, as is known, is sprayed on after the formation of the molded component.

SUMMARY OF THE INVENTION

Accordingly, it is a primary object of the present invention to provide a method of the type described which can be carried out simply and rapidly in production applications.

It is a more specific object of the present invention to provide a method of the type described in which the sheeting or film or shaped member, or plurality thereof, and at least one prefinished but not yet cured or hardened molding composition is introduced into a mold and maintained under a processing pressure and temperature for the hardening of the molded component.

The preconditioned and still soft molding composition is directly bonded to the sheeting or film or shaped member in that the plastic resin of the molding composition is partially pressed outwardly during the molding operation so as to bond with the sheeting or shaped member, and thereafter cures or hardens.

Consequently, the bonding process requires only a single operative step, and irrespective of the number of layers which are to be bonded together, in addition to which there is eliminated the need for other adhesives and for the application of adhesives. Depending upon the resin system and the thickness of the molded component, 1 to 5 minutes will usually be adequate to achieve a fully adherent and uniform bond over the entire surface area of the sheeting or film.

The inventive method is, however, also adapted for the surfacing of planar molded components, as well as irregularly configured or non-planar surfaces of molded components, such as are encountered in the interior decorations or exterior bodywork of vehicles.

For the molded components there can be, preferably, employed polyester low-pressure molded components whose processing temperature and pressure are relatively low at approximately 100° to 160° C. and from about 2 bars, so as to prevent any damage to the other layers which are to be bonded to the molded component.

The method of the present invention is also adapted for other molded components whose processing temperature and pressure are correlated with the relative strengths of the other layers, for example, such as epoxide resin, phenolic resin, and polyimide molded components.

It has been indicated that, in a surprising manner, the method as described hereinabove is adapted to produce a strong bond between molded components and the most different types of layers, which facilitates the production of durable sandwich or laminated constructions, and molded components with cover sheeting or films which are suitable for all branches of the industry.

For surfacing, there can be employed plastic material sheeting or films, as well as natural products, such as leather or wood veneers; in the last instance, for example, for the furniture industry. However, this method can also be employed to produce abrading tools when emery cloth is applied onto a molded component.

A further important application of the inventive method resides in the manufacture of light-weight, but relatively high-strength components, for instance, for aviation or aircraft components. Depending upon the particular application, a core member is bonded on one or both sides to a molded component and, when required, the surface thereof bonded to a cover sheeting or film in a single operative step through the described method.

Suitable for the core are either finely or coarsely porous members. When employing coarsely porous or honeycombed members, pursuant to a modification of the invention, one or more layers of a fabric are interposed between the member and the molded component.

During the pressing or molding operation, the liquid resin escapes from the molded component through the pores of the fabric so as to produce a good bond between the core and the molded component. The fabric serves to reduce or even prevent the resin from flowing away from the bonding locations into the pores. The fabric also serves to strengthen the sandwich or laminate construction, in that the oriented fibers contribute to the strength and rigidity of the formed composite.

The inventive method is also adapted for applying a brush coat of paint, varnish, lacquer or the like. The paint or varnish is hereby introduced into the mold especially through spraying, before the introduction of the molding material into the mold. Produced thereby are smooth varnished or lacquered surfaces of uniform layer thickness which will not evidence any overflow droplets.

BRIEF DESCRIPTION OF THE DRAWINGS

Reference may now be had to the following detailed description of preferred embodiments of the inventive method, taken in conjunction with the accompanying drawings; in which.

DETAILED DESCRIPTION

Figure 1:
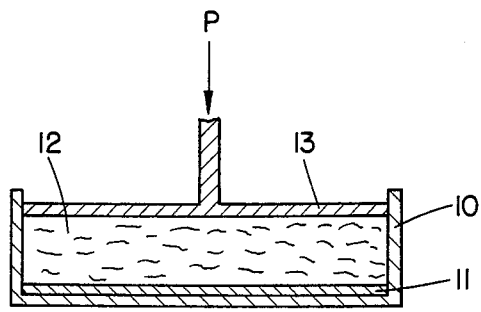
FIGS. 1 to 4 diagrammatically illustrate various embodiments for applications of the inventive bonding method.

Referring to the embodiment of FIG. 1, a film or sheeting, or plate 11 is positioned front face down in a preheated mold 10, or a paint, varnish or lacquer layer 11 is sprayed into the mold, and a conventionally preconditioned but not yet cured or hardened molding composition 12 inserted thereover in the mold.

When a polyester low-pressure molding component 12 is used, the composite 11, 12 is compressed using a pressing ram 13 at a pressure P of 12 to 7 bars. The mold 10 which is preheated to 100° to 120° C. to the resin in the molding composition 12 to soften, so that the resin is partially forced outwardly under the molding pressure and to bond with the film 11. The bonding process will be completed after 1 minute for thin, 1 mm or 2 mm thick molded panels or plates, and after about 5 minutes for relatively thicker molded components 12.

At the utilization of an epoxide resin molding component 12, the process is effected at a temperature of 120° to 170° C. and a pressure 1 to 7 bars. Higher temperatures of up to 300° C. are necessary for polyimides, where there are applied pressures of 5 to 10 bars.

The method is adapted for the manufacture of the most diverse composite components with the most varied shapes. Different in that the molded component is provided on one or more sides thereof, or only at various locations, with cover sheetings or plates having the desired properties.

Figure 2:
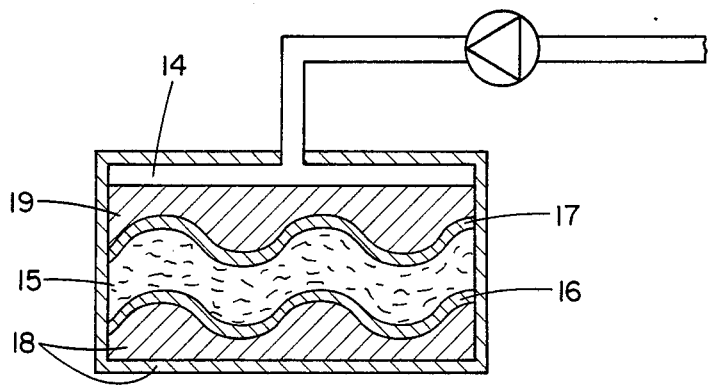

In accordance with the embodiment of FIG. 2, a profiled molded component 15, representative of regularly or irregular spatial configuration, such as arm rests, instrument panels or the like, is provided on respectively two sides thereof with a sheeting 16, 17, in which the sheetings have the same or different properties. The layers 16, 15, 17 which are successively introduced into a preheated mold 18, are covered with a suitably shaped pressing ram 19 and subjected to a pressurized gas 14.

The bonding of more than three layers can also be achieved in a single operation performed pursuant to the inventive method, in that the layers are successively positioned in a suitable mold and then jointly pressed at the processing pressure of the employed molded component and at the processing temperature of the layers. The composite component can be imparted various forms using the method as described herein.

As sheeting or films 11, 16, 17, 23, there can be utilized plastic materials, wood, fabric, leather, emery cloth sheets or varnishes and lacquers. The core members 22, 25 can be constituted of plastic, wood, foamed plastic compounds, paper or plastic honeycomb material. When required, fiber-reinforced materials can be used for both the molded component 12, as well as for the sheetings 11 and members 22, 25.

Figure 3:
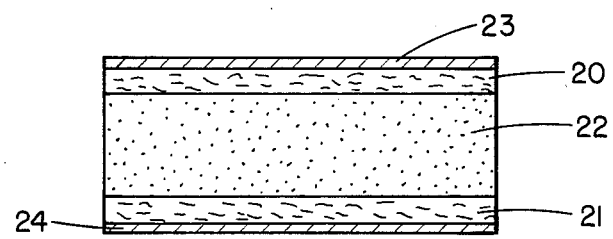

Illustrated in the embodiment of FIG. 3 is an example of two molded components 20 and 21 being bonded together by means of an intervening foamed plastic element 22, and also coated with cover sheetings or films 23 or 24. When use is made of finely-porous cores 22, there can be achieved a direct bond between the core 22 and the molded component 21 or 20.

Figure 4:
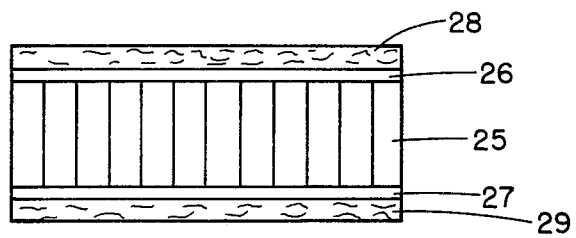

In the manufacture of composite components, as shown in FIG. 4 of the drawings, when using coarsely-pored or cellular members 25, an intermediate fabric layer 26 or 27 is positioned between the member 25 and the molded component 28 or 29. The fabric 26, 27 retains a sufficient amount of resin, which can flow into the pores, at the bonding location to ensure a proper adhesion of the layers.

The mold 10, 13 is made of plastic material, for example, epoxide resin or a low-melting metal or metal alloy. Naturally, other conventional metal molds can also be readily employed with the invention.

What is claimed is:

1. A method for bonding prefinished molded components of a non-hardened, uncured synthetic resin and filler material to members having a honeycomb or coarsely porous shape, comprising interposing at least one layer of fabric between the prefinished molded component and the member, and placing the prefinished molded component, fabric layer and member into a mold for curing and hardening and bonding to each other at the processing pressure and temperature of the molded component, wherein the at least one layer of fabric produces a good bond between the prefinished molded component and member while substantially preventing the resin from flowing from the bonding locations into the honeycomb or pores of the member.

* * * * *